Apr. 17, 1923.
H. J. GARCEAU
AUTOMOBILE LOCK
Filed Aug. 1, 1919
1,451,821
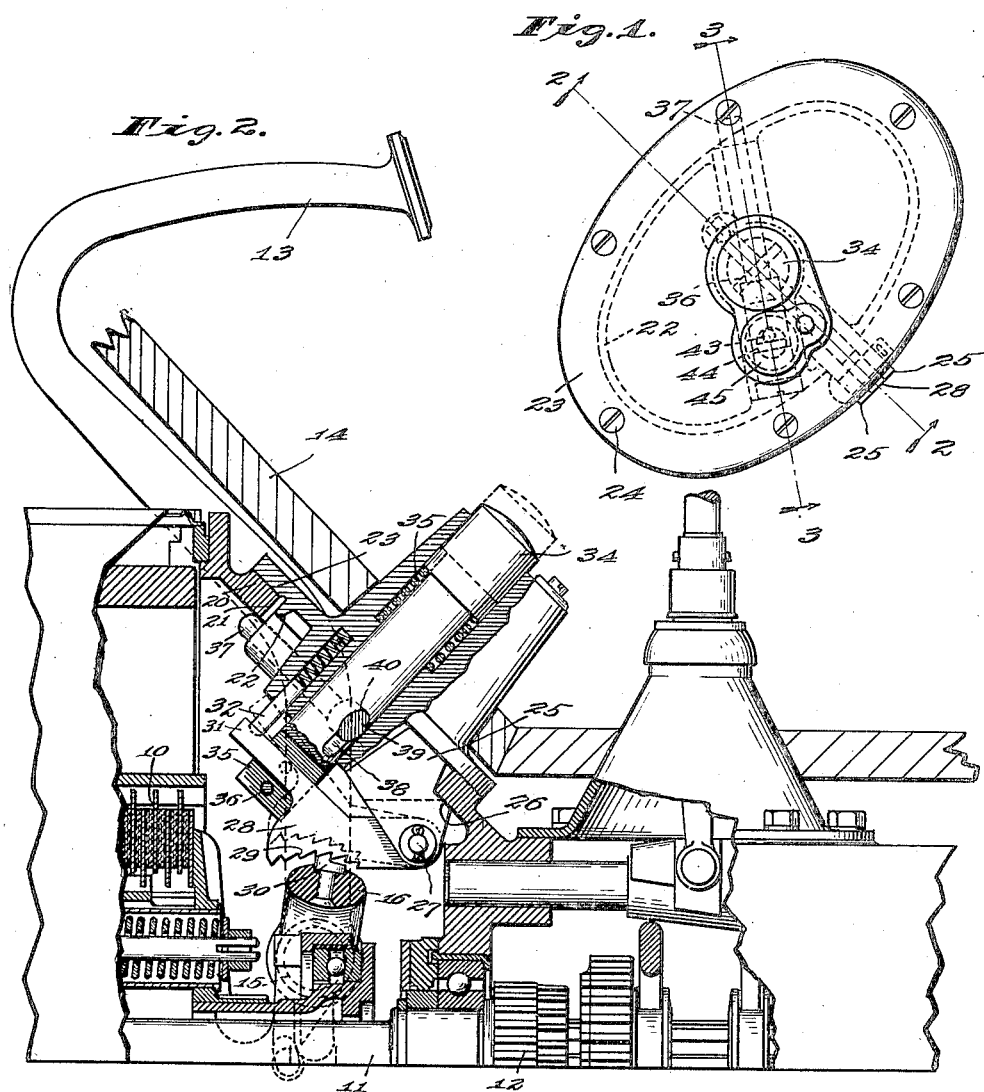
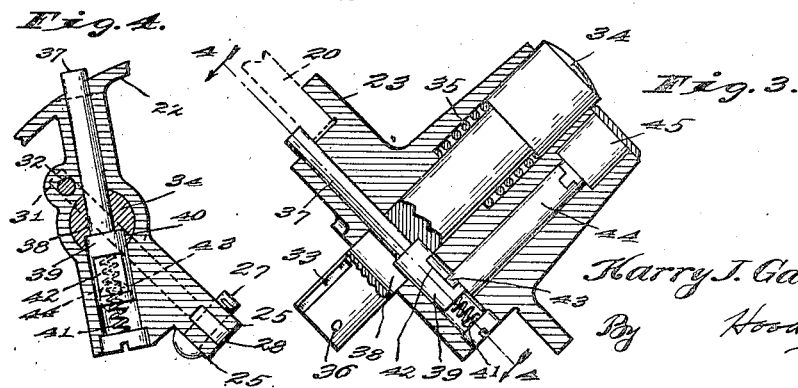

Patented Apr. 17, 1923.

1,451,821

UNITED STATES PATENT OFFICE.

HARRY J. GARCEAU, OF MUNCIE, INDIANA, ASSIGNOR TO WARNER GEAR COMPANY, OF MUNCIE, INDIANA, A CORPORATION OF INDIANA.

AUTOMOBILE LOCK.

Application filed August 1, 1919. Serial No. 314,651.

*To all whom it may concern:*

Be it known that I, HARRY J. GARCEAU, a citizen of the United States, residing at Muncie, in the county of Delaware and State of Indiana, have invented a new and useful Automobile Lock, of which the following is a specification.

It is the object of my invention to provide an efficient automobile lock, which will comply with the requirements of preventing the car from being driven while permitting it to be towed, which will be secure against tampering, and which will not be unduly expensive.

In accomplishing this result, I lock in released position the clutch between the engine and the transmission, and arrange the lock so that when it is in locking position any movement of the clutch pedal will serve merely to release the clutch more fully; and I arrange the locking mechanism so that when it is in locking position it not only locks the clutch in released position, but also locks itself in the transmission housing so that it cannot be removed even though the screws attaching it are removed.

The accompanying drawing illustrates my invention: Fig. 1 is a top view of my clutch lock; Fig. 2 is a fragmentary vertical section through a part of a clutch and transmission mechanism and the associated floor board and toe board of an automobile, equipped with my improved clutch lock, which is shown partly in section on the line 2—2 of Fig. 1; Fig. 3 is a section on the line 3—3 of Fig. 1; and Fig. 4 is a section on the line 4—4 of Fig. 3.

The clutch 10 is of any suitable friction type, being shown as of the multiple-disk type, and forms part of the power train or transmission mechanism between an automobile engine and the driving wheels, connecting the engine to the shaft 11 leading to the transmission gearing 12. The clutch 10 is controlled by the usual clutch pedal 13, which projects through the toe board 14 and is pivotally mounted so that when pushed forward or depressed it releases the clutch. This clutch lever 13 near its pivotal mounting 15 is usually provided with a cross-arm 16 which forms part of the clutch-operating yoke. It is on this cross-arm 16 that my clutch lock acts.

I mount my clutch lock on the transmission housing 20, which is provided with an oval or other non-round opening 21 into which projects a correspondingly shaped flange 22 of the plate 23 in which my clutch lock is mounted. This plate may be fastened to the transmission housing by screws 24; but even if such screws are not in place the plate cannot be turned in the opening 21 because of the oval or other non-round shape of such opening and of the flange 22 projecting into it. From the under side of the plate 23 near the bottom thereof project a pair of lugs 25, which are provided with shoulders 26 which engage the inner surface of the housing 20 so that such housing is received between such shoulders 26 and the plate 23 at the lowermost point of such plate, as is clear from Fig. 2. The lugs 25 carry a pivot pin 27, on which is pivotally mounted a pawl 28 provided on its under face with a series of ratchet teeth 29 which co-operate with a toothed pin 30 riveted in the cross-arm 16. When the pawl 28 is in its lower or full line position, the teeth 29 co-operate with the toothed pin 30 to permit the clutch lever 13 to be pushed in and the clutch to be released but to prevent the clutch lever 13 from returning upward when the pressure of the operator's foot on it is removed and thereby to prevent the resetting of the clutch 10 after it has once been released. However, when the pawl 28 is in its upper or full-line position, the teeth 29 clear the toothed pin 30 and allow the clutch lever 13 to move freely in both directions to both release and set the clutch 10.

In order to control the pawl 28, it is provided with a forwardly extending finger 31, with which co-operates a light spring-pressed plunger 32 tending to hold such pawl down in its full-line position. The finger 31 passes through a transverse slot 33 in the lower end of a main plunger 34, which is pressed upward by a spring 35 toward the dotted-line position but may be pushed down by the operator's foot against the action of the spring 35 into the full-line position shown in Fig. 2. A cross-pin 36 extends across the slot 33 beneath the finger 31, so that when the plunger 34 is in its normal or dotted-line position the pin 36 holds the pawl 28 up in its dotted-line position and the teeth 29 out of engagement with the toothed pin 30. In order to get this action, of course, the spring 35 is stronger than the spring of the plunger 32.

Thus in locking the car, the plunger 34 is depressed against its spring 35.

In order that the plunger 34 may be held in its depressed or locking position, a pin 37 is slidably mounted in the plate 23 and extends transversely through a slot 38 in the plunger 34. The pin 38 is provided with an enlarged head 39, and the slot 38 is provided with an enlargement 40 which registers with the head 39 when the plunger 34 is depressed. A spring 41 tends to push the pin 37 in the direction to insert such head 39 in the enlargement 40. When the head 39 is in such enlargement, it locks the plunger 34 against upward movement, or from its full-line position to its dotted-line position. The pin 37 projects through and beyond the plate 23 when the head 39 is seated in the enlargement 40, and underlies the housing 20 at a point on the opposite side of the opening 21 from the shoulders 26; so that when the head 39 is in the enlargement 40 to hold the plunger 34 depressed, the projecting end of the pin 37 and the shoulders 26 both underlie the housing 20 and prevent the removal of the plate 23 even though the screws 24 are removed. This in connection with the oval shape of the hole 21 and the flange 22, prevents the lock from being unlocked by attempts to remove it or to change its position.

The head 39 of the pin 37 is provided with a lateral slot 42, which receives an eccentric pin 43 on a rotatable shaft 44 which may be operated by a proper key in a suitable associated tumbler lock 45, mounted in the plate 23 beside the plunger 34. With the parts in the position shown in Fig. 3 the pin 37 is in locking position; but the turning of the shaft 44 to this position merely makes it possible for the spring 41 to move the pin 37 to the position shown, and the pin 43 does not itself move the pin 37 to locking position. When by a proper key in the lock 45 the shaft 44 is turned from the position shown in Fig. 3, however, the eccentric pin 43 moves the pin 37 and its head 39 against the action of the spring 41, thus moving the head 39 out of the enlargement 40 and removing the end of the pin 37 from beneath the under face of the housing 20 at the edge of the opening 21. The removal of the head 39 from the enlargement 40 permits the spring 35 to move the plunger 34 outward and upward, to raise the pawl 28.

In operation, the plunger 34 is normally in its elevated or dotted-line position, so that the pin 36 holds the pawl 28 in its inoperative or dotted-line position. The clutch 10 may now be set and released at will, by the manipulation of the clutch lever 13, as the movements of such clutch lever are not interfered with. When it is desired to lock the car, the lock 45 is manipulated by its key to move the eccentric pin 43 to the position shown. Thereupon, when the plunger 34 is pressed down (for it need not be pressed down until after the lock 45 is set) and the opening 40 comes into registry with the head 39, the spring 41 moves the pin 37 to force the head 39 into the opening 40 and the end of the pin 37 into locking position beneath the housing 20. This may be done while the clutch is either set or released. If it is released, it is locked in that position. If it is set, the next time the clutch lever 13 is depressed to release the clutch the teeth 29 of the now lowered pawl 28 co-operate with the toothed pin 30 to prevent the return of such lever and the resetting of the clutch. The car can now not be driven by its engine, because the power train between the engine and the driving wheels is broken. However, although the car cannot be driven, there is nothing to interfere with its being towed, as is required for automobiles by the police regulations of many cities.

I claim as my invention.

1. In an automobile lock, the combination with the clutch-controlling lever, of a pawl, said pawl and said lever having co-operating ratchet teeth which when the pawl is in locking position permit movement of the lever to release the clutch but prevent its movement to set the clutch, a movable member for controlling the position of said pawl, and a locking pin which when in locking position locks said pawl-controlling member in position to permit the teeth on said pawl and said clutch lever to co-operate.

2. In an automobile lock, the combination with the clutch-controlling lever, of a pawl, said pawl and said lever having co-operating ratchet teeth which when the pawl is in locking position permit movement of the lever to release the clutch but prevent its movement to set the clutch, a movable member for controlling the position of said pawl, a locking pin which when in locking position locks said pawl-controlling member in position to permit the teeth on said pawl and said clutch lever to co-operate, and a plate on which said pawl, said pawl-controlling member, and said locking pin are mounted, said locking pin when in locking position being arranged to lock said plate against removal.

3. In combination with the clutch, the transmission gearing, and the transmission housing of an automobile, said transmission housing being provided with a non-round opening, a plate having a non-round flange fitting in said opening and provided with shoulders which project beneath said housing at one side of said opening, and locking mechanism carried by said plate and including a locking member which when in locking position projects beneath said housing on the opposite side of said opening from said shoulders.

4. In combination with the transmission mechanism of an automobile and the housing therefor, said housing being provided with a non-round opening, a plate having portions which fit within said non-round opening to prevent turning of the plate therein, and locking mechanism carried by said plate and co-operating with said transmission mechanism to lock the latter with the power train broken, said locking mechanism including a locking member which when in locking position prevents the removal of said plate from said opening.

5. In combination with an automobile clutch, a pawl which when in one position co-operates with said clutch to hold it in released position, a plunger controlling said pawl and having two positions in which it respectively permits the pawl to move to locking position and withdraws it from locking position, and locking mechanism for holding said plunger in its first position.

6. In combination with an automobile clutch, a pawl which when in one position co-operates with said clutch to hold it in released position, a plunger controlling said pawl and having two positions in which it respectively permits the pawl to move to locking position and withdraws it from locking position, a spring tending to move said plunger into its second position, and locking mechanism for holding said plunger in its first position.

7. In combination with an automobile clutch, a pawl which when in one position co-operates with said clutch to hold it in released position, said pawl being spring-pressed toward such locking position, a plunger controlling said pawl and having two positions in which it respectively permits the pawl to move to locking position and withdraws it from locking position, a spring stronger in effect than the spring acting on said pawl and tending to move said plunger into its second position, and locking mechanism for holding said plunger in its first position.

8. In combination with an automobile clutch, a pawl which when in one position co-operates with said clutch to hold it in released position, a plunger controlling said pawl and having two positions in which it respectively permits the pawl to move to locking position and withdraws it from locking position, said plunger when in its first position permitting movement of the pawl away from locking position, and locking mechanism for holding said plunger in its first position.

9. In combination with an automobile clutch, a pawl which when in one position co-operates with said clutch to hold it in released position, said pawl being spring-pressed toward such locking position, a plunger controlling said pawl and having two positions in which it respectively permits the pawl to move to locking position and withdraws it from locking position, said plunger when in its first position permitting movement of the pawl away from locking position, and locking mechanism for holding said plunger in its first position.

10. In combination with an automobile clutch, a pawl which when in one position co-operates with said clutch to hold it in released position, said pawl being spring-pressed toward such locking position, a plunger controlling said pawl and having two positions in which it respectively permits the pawl to move to locking position and withdraws it from locking position, and locking mechanism for holding said plunger in its first position.

11. In combination with an automobile clutch, a pawl which when in one position co-operates with said clutch to hold it in released position, a plunger controlling said pawl and having two positions in which it respectively permits the pawl to move to locking position and withdraws it from locking position, and locking mechanism for holding said plunger in its first position, said locking mechanism including a spring-pressed member tending to move into locking position when said plunger is moved to its first position and a lock for retracting said spring-pressed member.

12. In combination with the transmission mechanism of an automobile and the housing therefor, locking mechanism co-operating with said transmission mechanism to lock the latter with the power train broken, and a plate carrying said locking mechanism and mounted on said housing, said plate and said housing having interengaging parts which prevent the turning of the plate on the housing when the plate is in its position thereon even though the attaching means be removed, and said locking mechanism including a locking member which when the locking mechanism is in locking position prevents the removal of said plate from its position on said housing.

13. In combination with a housing, and mechanism therein to be locked, locking mechanism co-operating with said mechanism to be locked to lock it, and a plate carrying said locking mechanism and mounted on said housing, said plate and said housing having interengaging parts which prevent the turning of the plate on the housing when the plate is in its position thereon even though the attaching means be removed, and said locking mechanism including a locking member which when the locking mechanism is in locking position prevents the removal of said plate from its position on said housing.

14. In combination with the transmission mechanism of an automobile and the housing therefor, said housing being provided with an opening, a member removably mounted on said housing at said opening, said transmission mechanism having operating devices supported separately from said member, and locking mechanism carried by said member and co-operating with said transmission mechanism to lock the latter with the power train broken, said locking mechanism including a locking member which when in locking position prevents the removal of said member.

15. In combination with the transmission mechanism of an automobile and the housing therefor, said housing being provided with an opening, a member removably mounted on said housing at said opening, said transmission mechanism having operating devices supported separately from said member, and locking mechanism carried by said member and co-operating with said transmission mechanism to lock the latter against movement from a predetermined position, said locking mechanism including a locking member which when in locking position prevents the removal of said member.

16. In combination with the friction clutch of an automobile and its operating mechanism, a housing associated therewith and provided with an opening, a member removably mounted on said housing at said opening, and locking mechanism carried by said member and co-operating with said clutch to lock the latter in released position, said locking mechanism including a locking member which when in locking position prevents the removal of said member.

17. In combination with the friction clutch of an automobile and its operating mechanism, a housing associated therewith and provided with an opening, a member removably mounted on said housing at said opening, and locking mechanism carried by said member and co-operating with said clutch to lock the latter in a predetermined position, said locking mechanism including a locking member which when in locking position prevents the removal of said member.

In witness whereof, I, HARRY J. GARCEAU, have hereunto set my hand at Muncie, Indiana, this 9th day of July, A. D. one thousand nine hundred and nineteen.

HARRY J. GARCEAU.